Nov. 17, 1953  W. J. ZENNER  2,659,767
TAPE CONTROLLED TELEGRAPH TRANSMITTER
Filed Nov. 1, 1951

INVENTOR
WALTER J. ZENNER
BY Emery Robinson
ATTORNEY

Patented Nov. 17, 1953                                                              2,659,767

UNITED STATES PATENT OFFICE 2,659,767

TAPE CONTROLLED TELEGRAPH
TRANSMITTER

Walter J. Zenner, Des Plaines, Ill., assignor to
Teletype Corporation, Chicago, Ill., a corporation of Delaware Application November 1, 1951, Serial No. 254,319

14 Claims. (Cl. 178—17)

This invention relates to tape controlled telegraph transmitters and more particularly to high speed tape sensing devices for controlling generation of signals comprising a series of permutated impulses.

In the prior art, there exists numerous sundry types of tape controlled telegraph transmitters employing mechanically operated sensing elements for ascertaining the presence or absence of permutated apertures in message tape. Upon the sensing of an aperture in the message tape by these sensing devices, the invariable result is the movement of a pivotally mounted contact arm about a fixed shaft into engagement with a contact to condition a transmitting circuit for the transmission of an impulse indicative of the sensed aperture in the tape.

These devices are limited in their speed of operation due to a number of reasons among which are the slowness of the pivotally operated contact arm in reacting to the movement of the sensing element which is the result of overcoming static friction between the contact arm and its fixed pivot shaft. Further these devices have generally taken the form wherein a large number of elements of considerable mass are employed, hence the initial inertia to be overcome during a sensing operation results in a time delay prior to each sensing operation. Another factor which has led to relatively low speed of operation of these prior sensing devices has been the employment of intermittently operated sensing mechanisms, viz.; the tape feeding operation occurs during one portion of a cycle of operation and the movement of the tape sensing levers occurs during another portion of the cycle of operation.

In the use of the pivotally mounted contact arms, another inherent disadvantage may be noted which results in decreased operating speeds; namely, the tendency of the rapidly moving contact arms to rebound or bounce upon engagement with a contact. Manifestly, the occurrence of rebound or bounce results in the transmission of an unsteady or fluxuating signal which may ultimately affect the performance of the telegraph receiving apparatus. In addition, a much more salient impediment resides in the fact that the period of engagement of the contact elements prior to the period of rebound or bounce, may be of such an infinitesimal duration as to be incapable of conditioning an electric circuit for the transmission of any perceptible impulse. This rebounding or bouncing condition also subjects the pivoted contact arms to vibrations which obviously interfere with the proper functioning of the contact arms. Another pernicious effect of the rebounding or bouncing of the contact arms is the possibility of occurrences of arcing conditions between the contact arms and the contacts causing the contacts to ultimately pit and therefore necessitate the periodic replacement of the contacts. Inasmuch as the contact arms have to be repositioned following each sensing operation, the effects of rebounding or bouncing must be overcome by holding the contact arms in each position for prolonged periods of time, consequently the ultimate speed at which the prior art tape controlled transmitters are capable of operating is curtailed.

Accordingly, it is a primary object of this invention to provide a simple and inexpensive tape controlled transmitter for operation at ultra high speed.

It is a further object of this invention to provide a tape controlled transmitter wherein bounce, rebounding or vibration of the elemental parts is eliminated or substantially reduced to permit ultra high speed operation.

It is another object of the invention to provide a tape controlled transmitter wherein the elemental parts are moved without utilization of fixed pivot points.

A more specific object of the invention resides in the provision of a tape sensing device having a hinged connection between the sensing levers and the contact elements.

Another specific object of the invention is to provide a tape sensing device employing contact elements which are pivoted about fixed contacts by the sensing members.

With these and other objects in view, the present invention contemplates the provision of a plurality of tape sensing levers for sensing permutations of apertures in message tape. To each of these sensing levers is pivotally connected a contact blade which is normally maintained in engagement with a first contact rod by a bail. The bail is adapted to be oscillated through a motor driven reciprocating rod. Movement of the bail from engagement with the contact blades results in the movement of the sensing levers under the impetus of springs which engage the sensing levers. Movement of the sensing levers causes the contact elements to pivot about the first contact rod into engagement with a second contact rod and further movement of the sensing levers causes the contact blades to pivot about the second contact rod whereby the contact blades are moved from engagement with the first contact rod.

Other objects and advantages of the present invention will be apparent from the following detailed description when considered in conjunction with the accompanying drawing wherein.

Figure 2:
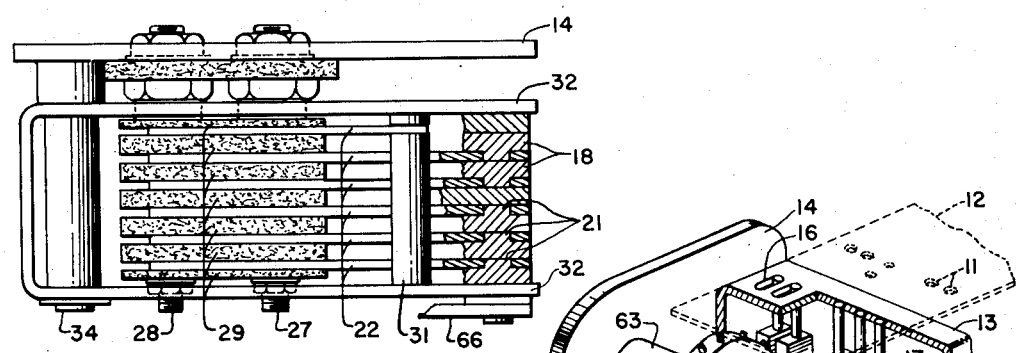
Fig. 2 is a top plan view of the contact blades which illustrates the distinctive connection between the sensing levers and the contact blades.
Figure 1:
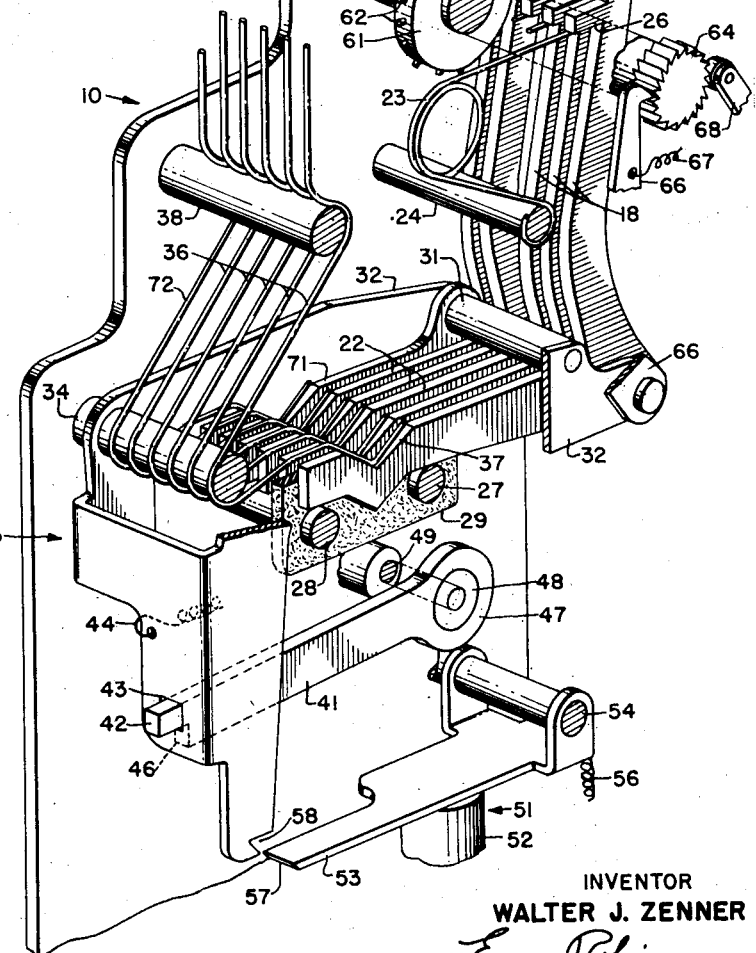
Fig. 1 is a perspective view partially in section showing the principal elemental parts of a tape controlled transmitter comprising the invention.

Referring now to the drawing and more particularly to Fig. 1, there is shown a tape controlled telegraph transmitter generally designated by the reference numeral 10 which senses code combinations of perforations 11 positioned transversely and successively on a continuous tape or preform 12. The tape is advanced through the transmitter 10 in one step intervals to pass over a U-shaped plate 13 secured between a pair of side plates 14 (only one of which is shown in the drawing). A plurality of longitudinal slots 16 are formed in the U-shaped plate 13 and positioned within each slot is a sensing pin 17 fixed to a sensing lever 18. The sensing levers 18 are formed out of some insulating material, such as a phenolic base compound, in such a manner as to provide a projecting stud 21 (Fig. 2) formed on its lower extremity. Pivotally mounted on each of the studs 21 is a rigid switch blade 22 made of some conductive material such as copper. It may be thus appreciated that the distinctive construction of the sensing levers 18 with the studs 21 provide spacing elements to separate the switch blades 22. Forcing each one of the sensing levers 18 upwardly to engage with the tape 12 is a coiled spring 23 having one end formed in a loop wrapped around an elongated stud 24 securely mounted within the side plates 14. The other ends of the coiled springs 23 engage abutments 26 formed integral with the sensing levers 18. The resultant of the force exerted by each coil spring 23 is a force tending to move each sensing lever 18 upwardly and further an additional force is provided tending to urge each sensing pin 17 against the trailing extremity of each slot 16.

Returning now to a further consideration of the switch blades 22, they are normally positioned in engagement with a first spacing contact rod 27 which underlies each of the switch blades in a transverse fashion. The spacing contact rod 27 is mounted upon one of the side plates 14 and is connected to a source of negative battery or to ground, hence providing a convenient source of a spacing telegraph signal which is indicated by a negative current impulse or a no current impulse as determined by the particular system in which the telegraph transmitter is desired to be employed. A second marking contact rod 28 also underlies the switch blades 22 in a transverse fashion, but as shown in Fig. 1, the switch blades do not normally engage this rod. Again the marking contact rod 28 is securely mounted to one of the side plates 14 but, in this instance, the contact rod is connected to a source of positive battery hence providing a convenient source of positive battery to produce positive or marking impulses for use in producing telegraph signals. Securely mounted on rods 27 and 28 are a plurality of insulating plates 29 in such a manner as to be interposed between each switch blade 22 thereby electrically isolating each switch blade from its adjoining blades.

Holding the sensing levers 18 downwardly against the effect of the coiled spring 23 is a bail roller 31 which overlies each of the switch blades 22 and is mounted between a pair of side arms 32 forming part of a bail assembly 33. The bail assembly 33 is pivotally mounted about a shaft 34 extending between the side plates 14 of the transmitter housing. Shaft 34 also provides a mounting for a plurality of contact tension springs 36 which are wrapped thereabout and have one of their free ends formed in the shape of a V to engage within V-shaped notches 37 formed in the switch blades 22. The opposite ends of the contact tension springs 36 are partially wrapped around a pin 38 extending between the side plates 14. It is to be understood that this particular mounting for the springs 36 places these springs under continual tension to exert a force on the switch blades 22 tending to urge them into engagement with the marking contact rod 28.

The position assumed by the bail assembly 33 is controlled through the instrumentality of a reciprocating arm 41 having formed on its forward end a projecting portion 42 positioned to ride within a square hole 43 formed in the front face of the bail assembly 33. A tension spring 44 is connected to the front face of the bail assembly 33 in such a manner as to exert a continuous force on the bail assembly to cause the front face of the bail assembly to be maintained in continual engagement with the step backed face 46 of the operating arm 41. Formed on the opposite end of the operating arm 41 is an enlarged collar 47 into which is fitted an eccentric 48 adapted to be driven by an electric motor (not shown) through the instrumentality of a drive shaft 49.

Positioned beneath the bail assembly 33 is a latching device 51 adapted to control the operation of the bail assembly 33 by the reciprocating operating arm 41. The latching device 51 comprises a solenoid 52 and an armature 53 pivotally mounted on a stud shaft 54. As shown in Fig. 1, the solenoid 52 is energized to draw up the armature 53, however, when the solenoid 52 is de-energized the armature 53 pivots about the shaft 54 under the impetus of a spring 56 to move a latching edge 57 of the armature 53 into position to engage the bail assembly 33 within a notch 58 formed therein.

In the normal or unoperated position, the solenoid 52 is de-energized thereby causing the latching edge 57 to engage the bail 33 within the notch 58. Therefore, the reciprocating arm 41 is ineffective to oscillate the bail assembly 33 about its shaft 34 because the armature 53 through its latching edge 57 holds the bail assembly 33 against the effect of the tension spring 44 which tends to maintain the front face of the bail assembly 33 in engagement with the step backed face 46 of the reciprocating arm 41.

The tape 12 is advanced through the transmitter 10 by means of feed wheel 61 having a plurality of pins 62 attached to its periphery which engage a longitudinal row of perforations formed in the tape 12. The feed wheel 61 is fixed to a shaft 63 rotatably mounted within the side plates 14 and the shaft is provided at one end with a ratchet 64. Engaging the ratchet 64 is a feed lever pawl 66 pivotally mounted on the outer side arm 32 of the bail assembly 33 and maintained in engagement with said ratchet by the influence of a tension spring 67. The ratchet 64 is provided with the usual anti-backlash roller mounted on a spring biased arm 68 to insure movement of the ratchet in only one direction.

In order to initiate operation of the transmitter 10, solenoid 52 is energized to withdraw the latching edge 57 of the armature 53 from within the notch 58 thereby allowing the bail assembly 33 to be moved by the tension spring 44 into engagement with the step backed face 46 of the reciprocating arm 41. The bail assembly 33 is now caused to oscillate about the shaft 34 in a simple harmonic motion to withdraw the bail roller 31 from engagement with the switch blades 22. If a permutated perforated tape 12 is positioned above the sensing pins 17 when the bail roller 31 is pivoted upwardly then the particular sensing pins 17 positioned beneath the permutated perforations 11 are moved within the perforations by the sensing levers 18 acting under the influence of the coiled springs 23. Due to the pivotal connections between the sensing levers 18 and the switch blades 22 and the forces exerted on the switch blades 22 by the contact springs 36 the movement of the sensing lever 18 is imparted to the switch blades 22 causing said switch blades to pivot about the spacing contact rod 27 into engagement with the marking contact rod 28. Further movement of the sensing levers 18, subsequent to the engagement of the switch blades 22 with the marking contact bail 28, causes the switch blades 22 to pivot about the marking contact rod 28 and out of engagement with the spacing contact rod 27.

The particular electrical connections have not been shown but it is understood that negative battery or no battery is supplied to the spacing contact rod 27 and positive battery is supplied to the marking contact rod 28; consequently, the permutated positions assumed by the switch blades 22 after the occurrence of a sensing operation causes electrical impulses to be transmitted from either the contact rods 27 or 28, through the switch blades 22, through the contact tension springs 36, and hence from there to a transmitter distributor of any well known type such as a rotary mechanical commutator segment type or an electronic type.

In order to condition the transmitter distributor for operation it is often necessary to supply initiating impulses and this may be readily supplied by the present transmitter in that a sixth switch blade 71 is pivotally mounted on the bail roller 31. Therefore, each time the bail roller 31 is oscillated, the switch blade 71 moves into engagement with the marking contact rod 28 to supply a positive impulse to a tension contact spring 72. This impulse may be used for initiating operation for the mechanical or electronic transmitter distributor or this impulse may be utilized as a synchronizing pulse for maintaining synchronism between a plurality of telegraph apparatus located at various remote receiving stations.

Upon completion of each sensing operation, the tape 12 is advanced one increment to bring another transverse row of permutated apertures 11 into position to be sensed by the sensing pins 17. This is accomplished by advancing the feed wheel 61 in one step increments. Each time that the bail assembly 33 is oscillated in a counterclockwise direction, the spring biased feed lever pawl 66 is caused to move upwardly and advance over one of the teeth on the ratchet 64 and upon each clockwise movement of the oscillating bail 33, the feed lever pawl 66 is caused to engage a tooth to move said ratchet one increment and as a consequence, the feed wheel 61 and tape 12 is advanced a like distance.

An additional feature of the invention resides in providing an arrangement of elements which allows the sensing pins 17 to be withdrawn from within the perforations 11 while the tape is being advanced by the feed wheel 61. This result is accomplished by the distinctive spring biased sensing levers 18 which are permitted to pivot about the studs 21 during an advance of the tape 12. It is apparent that this feature allows for increased operating speeds because the tape does not have to be held stationary during the withdrawal of the pins 17, the pins 17 merely ride along with the tape until fully withdrawn, whereupon the coil springs 23 snap the pins 17 back into position for another sensing operation.

Figure 3:
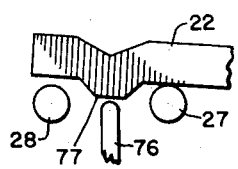
Fig. 3 discloses an alternative arrangement of contact blades and contact rods for providing a break before make contact assembly.

Referring to Fig. 3 there is shown an alternative mounting for the switch blade 22 in which a pivot post 76 is interposed between the spacing contact rod 27 and the marking contact rod 28. This particular arrangement provides a break before make contact action for the switch blades 22. This may be readily surmised when considering the counterclockwise movement of the switch blade 22 which occurs whenever the sensing pins 17 perceive perforations 11 in the tape 12, the switch blades 22 pivot in a counterclockwise direction bringing projecting portions 77 of the switch blades 22 into engagement with a pivot post 76, thereby making the pivot post 76 a pivot point for the switch blade 22. Movement of the switch blade 22 continues until the switch blade engages the marking rod 28, but it is to be noted that this engagement occurs subsequent to the breaking of engagement of the switch blade 22 with the spacing contact 27.

It is to be understood that the above described arrangements of apparatus and construction of elemental parts are simply illustrative of the principles of the invention and many other modifications may be made without departing from the spirit and scope of the invention.

What is claimed is:

1. In a tape sensing device, a plurality of articulated linkages, a first contact element, means for holding one link in each linkage in engagement with said first contact, a second contact element spaced from said linkage, means for actuating certain of the articulated linkages in accordance with permutated apertures in the tape, said actuation causing the links engaging the first contacts to pivot about said first contact into engagement with the second contact.

2. In a tape sensing device, a plurality of tape sensing means, a conductive element pivotally connected to each of the sensing means, a first contact positioned in engagement with said conductive elements, a second contact element spaced from said conductive elements, means for moving the tape sensing means to cause said conductive elements to pivot about the first contact as a fulcrum until the second contact is engaged and thereafter continue said pivoted movement of the conductive elements with the second contact as a fulcrum.

3. In a device for ascertaining the presence or absence of an aperture in a tape, a sensing member, means for urging the sensing member within an aperture in the tape, a conductive element pivotally connected to the sensing member, a first contact, a second contact, means for holding the sensing member against the effect of said urging means, said holding means also holding the conductive element in engagement with the first contact and spaced from the second contact, and means for releasing the holding means to render the urging means effective to move the sensing member into engagement with the tape, said movement of the sensing member being effective to pivot the conductive element about the first contact into engagement with the second contact.

4. In a tape sensing device, a plurality of hinged linkages, a first contact element, means for holding one link in each linkage in engagement with said first contact, a second contact element spaced from said linkages, and means for actuating certain of said linkages in accordance with permutated apertures in the tape, said actuation causing the links engaging the first contacts to pivot about said first contact into engagement with the second contact, said actuation continuing to pivot the links engaging the second contact about the second contact until the engagement with the first contact is broken.

5. In a tape sensing device, a plurality of sensing levers, a plurality of contact blades individually connected to each sensing lever to provide a pivoted joint, a first contact element, means for holding each contact blade in engagement with the first contact element, a second contact element spaced from the contact blades, means for releasing said holding means, and means for simultaneously pivoting both said sensing levers and contact blades about said pivoted joints in accordance with permutations of apertures in the tape, said pivoted movement of said contact blades causing the contact blades to pivot about the first contact element into engagement with the second contact element.

6. In a device for sensing permutatively apertured tape, a plurality of sensing levers, a conductive element connected to each lever, a pair of contact elements, means for holding the sensing levers from the tape and the conductive elements in engagement with one of said contact elements, means for releasing said holding means, and means for moving the sensing levers into a permutated position as determined by the apertures in the tape, said movement of the sensing levers causing said conductive elements connected thereto to pivot about the engaged contact element into engagement with the other of said contact elements, said movement of the sensing levers continuing until said conductive elements pivot from engagement with said first engaged contact element.

7. In a tape sensing device, a plurality of tape sensing members, means for urging the sensing members into engagement with the tape, a switch blade pivotally connected to each tape sensing member, a first contact element, a second contact element, means for forcing said switch blades into engagement with both of said contact elements, a bail for engaging said switch blades to hold the switch blades against the effect of the forcing means into engagement with only the first contact element, said bail being also effective to hold said sensing members from engagement with the tape, and means for oscillating said bail to render the urging means and the forcing means effective whereby said sensing members are permutatively moved within permutative apertures in the tape, said movement of the sensing members and the effect of said forcing means actuating said switch blades to pivot into engagement with the second element and out of engagement with the first contact element.

8. In a device for sensing permutatively apertured tape, a plurality of sensing levers, means for urging the sensing levers to move into a permutative position as determined by the permutated apertures in the tape, means for retaining the sensing levers against movement by said urging means, a conductive element pivotally connected to each sensing lever, a first contact element positioned in engagement with the conductive elements, a second contact element spaced from the conductive elements, means for biasing the conductive elements into engagement with the second contact element, said biasing means being rendered ineffective by said retaining means, means for releasing said retaining means to render effective said urging means to move said sensing levers into a permutated position as determined by the permutated apertures in the tape, said release of said retaining means also rendering said biasing means effective to move the conductive elements connected to the actuated sensing levers about the first contact element into engagement with the second contact element, said movement of the sensing levers being effective to pivot the conductive elements connected thereto about said second contact element to disengage the conductive elements from the first contact element.

9. In a preform sensing device, a plurality of freely mounted sensing members, a freely mounted switch blade pivotally connected to each of the sensing members, a plate having a plurality of slots formed therein, means for urging the sensing members through said slots and into engagement with a wall of each of said slots, a first contact, means for applying a force to the switch blades, means for holding the switch blades and sensing members against the effect of the urging means and the force apply means whereby the sensing members are restrained from passing through said slots and the switch blades are held in engagement with the first contact, a second contact, and means for periodically releasing said holding means to allow said urging means to move a permutation of sensing members through said slots as determined by a permutation of perforations in the preform, said release of said holding means also rendering effective said force applying means for pivoting the switch blades connected to the moved sensing members about the first contact into engagement with the second contact.

10. A tape sensing device comprising means for advancing the tape in one step increments to successively present transverse rows of permutated apertures to a sensing station, said sensing station including a plurality of freely mounted sensing members, means for urging the sensing members toward the tape, contact members individually connected to each sensing member to provide a hinged joint, means for maintaining said hinged joint broken to render said urging means ineffective, means for moving said maintaining means to permit said hinged joint to pivot under the influence of the urging means whereby the sensing members are permutatively moved within the transverse row of apertures positioned in the sensing station, a contact element normally spaced from said contact members, said pivoting of the hinged joints causing said contact members to move into engagement with said contact element, and means for simultaneously with-drawing said sensing members and actuating said tape advancing means.

11. In a tape sensing device, a plurality of sensing means mounted for horizontal and vertical movement, means for urging the sensing means in a vertical direction, means for holding the sensing means against said urging means, conductive elements connected to said sensing means to form hinged joints, a first contact means positioned to engage said contact elements, a second contact means spaced from said contact elements, means for actuating said hinged joints to position a permutation of sensing means within a permutation of apertures in the tape, said actuation of said hinged joints moving the permutation of conductive elements from engagement with said first contact means and into engagement with the second contact means, means for restoring the conductive elements into engagement with said first contact means, and means operated by said restoring means for advancing the tape while the sensing means are being withdrawn from the apertures in the tape, said advancement of the tape causing the sensing means to move horizontally therewith until the sensing means is withdrawn from the tape.

12. In a tape sensing device, means for advancing a permutatively apertured tape past a tape sensing station, said tape sensing station comprising a plurality of sensing members, an abutment formed on each sensing member, resilient tension means engaging each abutment for urging each sensing member into engagement with the tape, a plurality of conductive switch blades, each of said switch blades being pivotally connected to one of said sensing members, a bail engaging said switch blades for holding said sensing member from engagement with said tape, a first contact positioned transversely of said switch blades and in engagement with said switch blades, a second contact element positioned transversely of said switch blades and spaced therefrom, means for moving said bail to render the resilient means effective to move the sensing members into a permutative arrangement in accordance with the permutated apertures positioned in alignment with the sensing members, means rendered effective by the movement of the bail and sensing levers for moving the switch blades from engagement with the first contact element into engagement with the second contact element, and means controlled by the movement of said bail for actuating said tape advancing means.

13. In a tape sensing device, a plurality of sensing members, a conductive element pivotally connected to each of the sensing members, means for urging said sensing members to move into sensing position, means for restraining the functioning of said urging means, a special conductive element connected to said restraining means, a first contact positioned to engage all of said conductive elements, a second contact spaced from all of said conductive elements, means for moving said restraining means to cause a permutation of said sensing members as determined by a set of permutations of apertures in the tape to be moved by the urging means, said movement of the sensing members being effective to pivot the conductive elements about the first contact and into engagement with the second contact, said movement of the restraining means being effective to pivot the special conductive element into engagement with the second contact.

14. In a tape sensing device, a plurality of articulated linkages, each of said linkages having included therein a conductive link, a pivot element, means for holding each of said conductive links in engagement with said pivot element, a contact element spaced from said conductive links, and means for actuating certain of the articulated linkages in accordance with permutated apertures in the tape, said actuation causing the conductive links to pivot about the pivot element into engagement with the contact element, said actuation continuing to pivot the conductive link about the contact element and out of engagement with the pivot element.

WALTER J. ZENNER.

References Cited in the file of this patent

UNITED STATES PATENTS

| Number | Name | Date |
|---|---|---|
| 1,890,877 | Haselton | Dec. 13, 1932 |
| 2,010,158 | Kleinschmidt | Aug. 6, 1935 |